Nov. 23, 1954  A. H. ISENBERG  2,695,254
TERMINAL END CLOSURE FOR THERMALLY INSULATED CONDUITS
Filed April 20, 1953
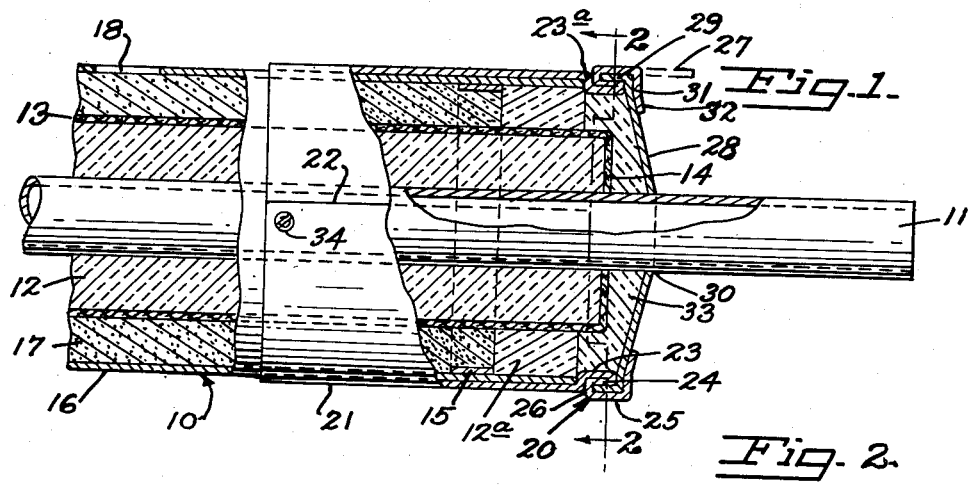
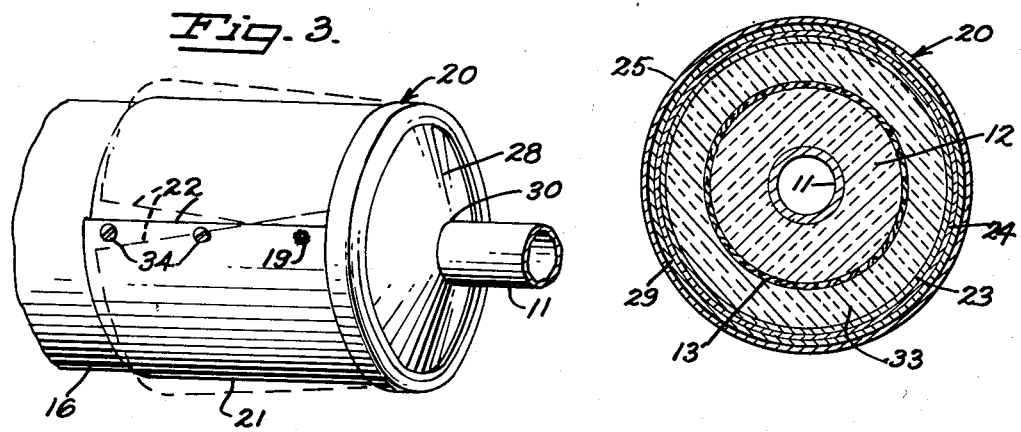
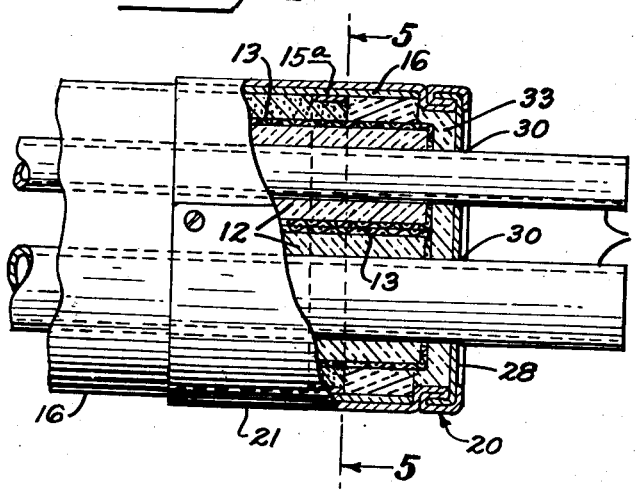
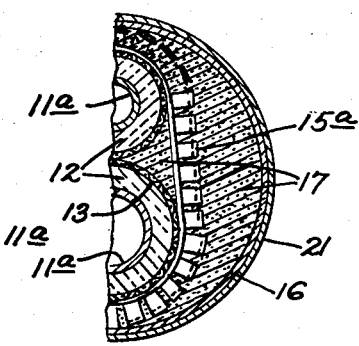
INVENTOR.
ALEXANDER H. ISENBERG
BY
ATTORNEY

United States Patent Office 2,695,254
Patented Nov. 23, 1954

2,695,254

TERMINAL END CLOSURE FOR THERMALLY INSULATED CONDUITS

Alexander H. Isenberg, Woodside, Calif.

Application April 20, 1953, Serial No. 349,920

4 Claims. (Cl. 154—44)

This invention relates broadly to terminal end closures for thermally insulated conduits and more particularly relates to closed ends of that type of thermally insulated conduits which are also sealed imperviously against entry of moisture by a circumferential bitumen layer within an outer casing, so that the conduit may be employed as a buried underground conduit which is protected from entry of moisture, the closed end of the present exemplification being employed under conditions where the thermal insulation and bitumen layer terminates because the conduit comes to an unburied terminal connection such as into a boiler room, a building, a manhole, or the like.

Briefly the invention comprises a conduit having centrally thereof a conveyor pipe of relatively heavy metal surrounded and enclosed by preformed insulation strips or blocks which terminate in spaced relation to the adjacent end of the inner conveyor pipe, the insulation being surrounded and enclosed by a layer of moisture impervious bitumen which in turn is enclosed within a relatively thin outer casing within which the bitumen layer is formed, the bitumen providing the moisture impervious layer in the conduit. The terminal ends of the bitumen and the thermal insulation are relatively stepped and are also spaced from the terminal end of the enclosed conveyor pipe. An end closure sleeve is mounted at said terminal end and has an end plate provided with an opening through which the conveyor pipe extends. The end closure sleeve circumferentially encloses and is secured to the relatively thin outer casing, a loose plastic thermal insulation aggregate being deposited within the end sleeve member at the end closure plate, the loose plastic insulation being self-forming to conform to the stepped terminal ends of the layers of preformed insulation or the bitumen upon sliding of the sleeve against said terminal ends to enclose the terminal end of the thin outer casing. The moisture impervious characteristics of the bitumen are well known, as well as its quality of being relatively semi-liquid or fluidified when heated so that it may be poured and that it congeals and hardens in situ when cooled to a reasonably normal temperature.

Preferred forms in which the invention may be embodied are described herein and illustrated in the accompanying drawing in which:

Fig. 1 is a side elevation of one form of the invention, partly broken away in central longitudinal section.

Fig. 2 is a transverse section on line 2—2 of Fig. 1.

Fig. 3 is a perspective view of the form of invention shown in Fig. 1.

Fig. 4 is a side elevation, partly in central longitudinal section, of a modified form of the invention.

Fig. 5 is a fragmentary lateral transverse section on line 5—5 of Fig. 4.

Referring to the drawing in which like reference characters indicate corresponding parts in the several views, 10 indicates generally a terminal end portion of a thermally insulated conduit which is preferably preformed in lengths as fabricated units at a plant removed from the place of installation, and shipped to the place of installation in such preformed lengths.

The conduit comprises a central inner conveyor pipe 11 of relatively heavy metal as compared with a relatively thinner outer casing to be described. The conveyor pipe is for conveying of fluid either heated above or cooled below normal temperatures where it is desired to maintain the temperature of the fluid being conveyed. Circumferentially of the inner conveyor pipe is a layer of thermal insulation material 12 such as magnesia, asbestos, or the like, preferably mounted as precast lengths of semi-circular members, the longitudinal edges of which are confrontingly opposed to surround the inner conveyor pipe. These precast insulation members are suitably compacted in end-to-end relation on the conveyor pipe and terminate in spaced relation to the adjacent ends of said conveyor pipe so that the end portion of the conveyor pipe extends beyond said insulation layer and is bare for connection to another similar unit or to some other facility at a terminal of the conduit unit. After such mounting the precast thermal insulation members may be circumferentially wrapped in a helical manner with a layer of binding materials 13, such as strips of cotton or indurated paper which, at the end of the insulation is folded over the exposed ends of the insulation material as at 14.

Spider spacer rings 15 are mounted circumferentially of the precast strips of thermal insulation at longitudinally spaced intervals, the spacer rings being an openwork structure through which a fluid may flow longitudinally as well as circumferentially to enclose the thermal insulation. Enclosing the thermal insulation and spaced therefrom by the spider spacer rings or channels 15 is mounted an outer casing 16 of relatively thin sheet metal, as compared with the heavier inner conveyor conduit, and the space between the thermal insulation 12 and the outer casing is filled with a water impervious bitumen 17 poured into the outer casing in heated fluidified condition, either from an open end of the casing or through one or more openings 18 intermediate such ends, the openwork of the spider spacers 15 permitting the fluid bitumen to flow circumferentially as well as longitudinally within the casing and congeal or harden therein and thus enclose the thermal insulation and sealing it against any entry of moisture which would deleteriously affect the insulation. In the preformed length of conduit it is preferable to have the bitumen layer 17 terminate short of the terminal end of the thin outer casing 16, whereas the precast insulation 12 is coterminous with or preferably extends beyond the end of said outer casing, thus providing a space beyond the end of the bitumen layer, the space being between the insulation 12 and the outer casing 16. This is desirable for connecting two of such lengths by a joint in a continuous line, but such joint is not a part of the present invention.

It is preferred that one of the spider spacer members 15 shall be mounted at the terminal end of the bitumen layer and that said space beyond the terminal end of the bitumen and which is between the insulation 12 and the terminal end portion of the thin outer casing shall be filled with precast blocks of insulation material 12a which are generally similar to the blocks 12, the blocks 12a being in the nature of filler members to decrease the quantity of a plastic insulation material which is employed in an end closure to be described.

Where one of these preformed lengths of conduits is at a terminal end of a conduit system, the terminal end of the unit of conduit usually comes into a building or into a manhole or the like above ground for connection of the conveyor pipe 11 to another facility, such as a source of supply or a discharge terminal. Such connection necessitates maintaining the end of the conveyor pipe 11 bare and requires the termination of the insulation and bitumen layers in spaced relation to the end of the conveyor pipe 11 so that a proper connection may be made.

Since the exposed end of the preformed insulation material is subject to chafing and breaking and since the bitumen layer is susceptible to softening and returning to its sticky fluid form when it becomes warm, as well as for neatness of appearance at the terminal end, means are provided to seal the exposed end of the bitumen and the insulation material and also to protect the terminal end of the outer casing. This means comprises a cylindrical sleeve 21 split longitudinally and having edges overlapping as at 22 and spot-welded as at 19 in spaced relation to one end thereof to hold the edges in a generally cylindrical form. Between the spot-weld and the adjacent end of the sleeve there is a wall portion inwardly rolled to preliminarily form one member of a seam generally indicated 20 and having an inset wall 23 which is retroverted outwardly parallelly upon itself as at 24 and thence returned upon itself substantially parallelly as at 25 providing an open groove 26 with an extended free end wall portion 27 extending in substantial alignment with the wall of sleeve 21, as indicated by dotted lines in Fig. 1.

At the groove end of the sleeve a disc closure plate 28 is provided which has a peripheral annular flange 29 inserted into the formed groove 26, the end plate being spaced from the terminal stepped end faces of the layers of insulation and bitumen material by the end of the outer casing contacting the shoulder 23a formed by insetting of the wall 23. The end closure plate 28 has one or more openings 30 therethrough through which the conveyor pipe or pipes extend. At its circumferential edge portion the plate 28, as shown in Fig. 1 has a flat rim portion 31 adjoining the flange 29 thus reinforcing the edge portion and facilitating a tightly fitted seat upon the inner edge of groove 26 when the flanged edge portion 29 seats in the groove 26, the extended portion 27 of the side wall being rolled inwardly tightly upon the face wall of the end closure plate as at 32, the several walls of the seam being flattened by rolling to perfect a tight joint.

Within the end closure sleeve there is deposited upon the inner face of the closure plate 28 a body of plastic thermal insulating slurry 33 (referred to herein as plastic insulation material to distinguish from the preformed insulation material), in sufficient quantity to make a self-forming fill by pressure against the terminal ends of the insulation blocks 12 and 12a. The sleeve is thereupon slid upon the end portion of the outer casing until the terminal end of the outer casing 16 contacts the inwardly formed shoulder 23a of the end closure, the plastic insulation slurry being thereby tightly packed in situ. The conveyor pipe 11 extends through opening 30, and the confronting edge portions of the cylindrical wall 21 of the sleeve beyond the spot-weld are drawn tightly around the outer casing of the conduit and the overlapping edges of the sleeve walls are secured in place by sheet metal screws 34 which are aligned with the spot weld.

In the end closure of Fig. 1 which is adapted for use with a single conveyor pipe it is preferred that the end closure plate 28 shall be conically tapered; whereas in Fig. 4 which is adapted for use with a plurality of conveyor pipes 11a it is preferred that the end closure plate 28 be in a flat plane substantially perpendicular to the longitudinal axis of the sleeve.

In Figs. 4 and 5 having a plurality of conveyor pipes 11a, it will be noted that the spider spacer rings 15a pass around both pipes and are therefore substantially oval rather than circular as in Fig. 1, though the mechanical structure of the spacer member is similar to Fig. 1 and permits the fluid bitumen to flow therethrough in the same manner, though in a layer of irregular thickness due to the curvature of the plurality of contacting insulated conveyor pipes, as shown in Fig. 5.

Having thus described the invention, what is claimed as new and patentable is:

1. A closed terminal end of a thermally insulated pipe conduit comprising the end portion of a relatively heavy conveyor pipe, a layer of thermal insulation material circumferentially enclosing the conveyor pipe and terminating in spaced relation to an adjacent end thereof, a layer of moisture impervious material surrounding said insulation layer, said moisture impervious layer being pourable upon heating and congealing upon cooling, an outer casing surrounding the moisture impervious layer and extending beyond the end thereof providing a circumferential space beyond the end of the moisture impervious layer and between the aforesaid layer of thermal insulation and the outer casing, a circumferential layer of thermal insulating material in said space beyond the end of the moisture impervious material, an end closure seated snugly circumferentially of the terminal end portion of said outer casing, the end closure comprising a tubular cylindrical sleeve body, a disc end plate secured to one end of the sleeve and having an opening in the plane thereof through which the conveyor pipe extends, said end plate being spaced from the terminal end faces of the said layers of insulation, and a body of plastic thermal insulation material within the end closure between said end plate and the terminal end faces of said circumferential layers of material, said end plate being secured to the sleeve by an inter-engaging seam providing a shoulder abutting the terminal end of the outer casing.

2. A closed terminal end of a thermally insulated conduit including the elements of claim 1 and in which there is a spider spacer member adjacent to the terminal end of the moisture impervious material and adjacent to said circumferential insulation-filled space beyond said terminal end, said spider spacer member being interposed between the outer casing and the insulation layer which encloses the conveyor pipe.

3. A closed terminal end of a thermally insulated conduit, including the elements of claim 1 and in which the layers of material between the conveyor pipe and the outer casing have their ends relatively stepped at the adjacent terminal ends thereof, and the body of plastic thermal insulation material extends between the end closure plate and the terminal end faces of said relatively stepped ends.

4. An end closure of a thermally insulated conduit, having the elements of claim 1 and in which the end closure plate is a conical disc.

References Cited in the file of this patent

UNITED STATES PATENTS

| Number | Name | Date |
|---|---|---|
| 1,709,844 | Durant | Apr. 23, 1929 |
| 2,107,588 | Smith | Feb. 8, 1938 |
| 2,258,176 | Denning | Oct. 7, 1941 |
| 2,347,855 | Varga | May 2, 1944 |
| 2,545,030 | Isenberg et al. | Mar. 13, 1951 |